(12) United States Patent  (10) Patent No.: US 7,580,630 B2
Kee et al.  (45) Date of Patent: Aug. 25, 2009

(54) SPECTRAL SHAPING FOR OPTICAL OFDM TRANSMISSION

(75) Inventors: Huai Kee, Old Harlow (GB); Richard Epworth, Sawbridgeworth (GB); Alan Robinson, Harlow (GB); Robin Rickard, Spellbrook (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 558 days.

(21) Appl. No.: 10/940,459

(22) Filed: Sep. 14, 2004

(65) Prior Publication Data

US 2005/0271387 A1    Dec. 8, 2005

Related U.S. Application Data

(60) Provisional application No. 60/577,657, filed on Jun. 7, 2004.

(51) Int. Cl.
*H04J 14/00* (2006.01)
*H04B 10/08* (2006.01)
*H04B 10/04* (2006.01)

(52) U.S. Cl. ............... 398/25; 398/28; 398/38; 398/76; 398/193; 398/197; 398/198

(58) Field of Classification Search ......... 398/25–28, 398/38, 76, 94, 100, 152, 158, 162, 192–195, 398/197, 198, 205, 208
See application file for complete search history.

(56) References Cited

U.S. PATENT DOCUMENTS

| 4,581,730 | A |   | 4/1986  | Ozeki et al. |
| 5,566,381 | A | * | 10/1996 | Korotky ............... 398/147 |
| 5,850,303 | A | * | 12/1998 | Yamamoto et al. ...... 398/91 |
| 5,896,211 | A |   | 4/1999  | Watanabe |
| 5,999,300 | A |   | 12/1999 | Davies et al. |
| 6,275,313 | B1 | * | 8/2001  | Denkin et al. ............ 398/9 |
| 6,469,812 | B2 | * | 10/2002 | McKiel, Jr. .............. 398/9 |

(Continued)

FOREIGN PATENT DOCUMENTS

JP    04054034 A  *  2/1992

(Continued)

OTHER PUBLICATIONS

U.S. Appl. No. 10/679,824, filed Oct. 6, 2003, Rickard et al.

(Continued)

*Primary Examiner*—Dalzid Singh
(74) *Attorney, Agent, or Firm*—Barnes & Thornburg LLP

(57) ABSTRACT

A transmitter for an optical transmission system transmits an optical sub carrier multiplexed signal comprising number of sub-carriers, onto an optical transmission path, and provides spectral shaping by different magnitudes of the sub-carriers, or different modulation formats for different sub carriers. This spectral shaping can reduce performance degradation by Kerr effect optical non linearities. This can mean higher input powers may be launched. The magnitudes can provide a signal spectrum which is lower near a center of a band of sub carriers than near an edge of the band. Such spectral shaping can be provided in the receiver either to undo the pre emphasis in the transmitter, or to reduce non linearities from components at the receiving side.

26 Claims, 11 Drawing Sheets

U.S. PATENT DOCUMENTS

| | | | |
|---|---|---|---|
| 6,525,857 B1 * | 2/2003 | Way et al. | 398/192 |
| 6,626,592 B2 * | 9/2003 | Watanabe | 398/150 |
| 7,012,912 B2 * | 3/2006 | Naguib et al. | 370/343 |
| 7,076,169 B2 * | 7/2006 | Shpantzer et al. | 398/76 |

FOREIGN PATENT DOCUMENTS

WO         03/028252      4/2003

OTHER PUBLICATIONS

U.S. Appl. No. 10/780,430, filed Feb. 17, 2004, Feced et al.

* cited by examiner

SPECTRAL SHAPING FOR OPTICAL OFDM TRANSMISSION

RELATED APPLICATIONS

This invention relates to U.S. patent application entitled "Optical Sub carrier Multiplexed Transmission", Ser. No. 10/679,824 filed on 6 Oct. 2003, and its corresponding international patent application, filed on 14 Sep. 2004, (Nortel Networks files 16231ID), and U.S. patent application entitled "Reference phase and amplitude estimation for coherent optical receiver" Ser. No. 10/780,430 filed on 17 Feb. 2004, (Nortel Networks file 16549ID), all three of which are incorporated herein by reference in their entirety. This application is the non-provisional filing of Provisional U.S. Application 60/577,657, filed Jun. 7, 2004.

FIELD OF THE INVENTION

This invention relates to transmitters, receivers, other components of communications systems, to corresponding methods and software, and to methods of offering a transmission service over such apparatus.

BACKGROUND TO THE INVENTION

It is well known in communication systems to communicate data using a carrier signal modulated with the data. In a conventional modulation format, such as amplitude modulation, a single carrier represents all of the data. Sub carrier Multiplexing (SCM) is a modulation format whereby the carrier transporting the data consists of a plurality of sub-carriers. SCM is used for carrying multiple data channels, typically arranged so that each channel is modulated onto an individual subcarrier. More recently systems have been built where a single data channel is spread over several subcarriers (as is the case for Orthogonal Frequency Division Multiplexing, OFDM, explained below). Each sub carrier is conventionally generated from a common source, and is modulated independently and thus represents part of the data being represented by the whole carrier.

According to known radio sub carrier systems, each sub carrier is generated by modulation of individual carriers, which are then combined to yield a sub carrier multiplexed signal. This technique has the disadvantage that individual apparatus may be provided to generate each sub-carrier, substantially increasing the cost of the system. Furthermore, guard bands between sub-carriers reduce the spectral efficiency of the modulation format, reducing the data capacity of an optical communications system.

One type of sub carrier system is an Orthogonal Frequency Division Multiplexing (OFDM) communication system. In this case, the data is spread across all the sub-carriers. FIG. 1 shows a typical spectrum of an OFDM signal, with six sub-carriers spaced in frequency. Guard bands can be provided between sub-carriers but are not shown here, since in OFDM, adjacent sub-carriers can overlap yet do not interfere with one another as they appear orthogonal when received using a FFT correctly synchronised with the symbol provided that the subcarrier spacing is the inverse of the symbol length. The modulation format utilised to modulate each sub carrier can be chosen according to the system requirements. The symbol rate of an SCM signal is therefore defined by the number of sub-carriers, and the modulation format and rate utilised for each sub-carrier. For example if four binary modulated sub-carriers are utilised the symbol rate will be a quarter of the bit rate carried by the aggregate SCM signal. Alternatively if four quadrature modulated sub-carriers are utilised, the symbol rate will be one eighth of the bit rate carried by the aggregate SCM signal.

OFDM signals exhibit high resilience to linear distortion impairments because the information is encoded in the frequency domain. These are known in radio communication systems but not in optical communication systems until the above referenced pending US patent application ref 16231ID. Optical communication systems suffer more severely from certain impairments than radio communication systems, for which the OFDM technique was initially developed. Orthogonal Frequency Division Multiplexing (OFDM) systems encode the information as a concatenation of blocks in the frequency domain. An inverse fast Fourier transform converts the information to the time domain before its transmission along the channel. A fast Fourier transform at the receiver recovers the original transmitted sequence.

If OFDM is implemented in optical communication systems as shown in the above referenced pending U.S. and international patent applications ref 16321ID, the transmitted information can be encoded in frequency by means of a given phase/amplitude modulation format like QPSK, QAM 16, QAM 32 and similar formats. Amplitude modulation formats and phase modulation formats are also possible. The polarisation dimension can also be exploited by polarisation multiplexing. For phase/amplitude modulation formats and phase modulation formats the receiver may employ a coherent-type detection scheme whereby the in-phase and quadrature components of the signal are measured. For amplitude modulation formats coherent detection is not required. Linear impairments, like chromatic and polarisation mode dispersion, can be easily equalised once the received sampled signal is converted back to the frequency domain to extract the original data.

One advantage of OFDM is that if a guard-band with cyclic prefix is included before transmission, then the received sequence is the circular convolution of the input signal with the channel response. This permits a very easy equalisation of linear impairments, as circular convolutions become products in the Fourier domain where the information is encoded. The only limitation is that the time interval over which the channel impulse-response-time extends should be smaller than the size of the allocated guard-band.

Inter channel interference, ICI, in radio transmissions is fundamentally different to ICI in optical fibers and so radio techniques are not generally appropriate for optical systems. One such difference is that the transmission medium is dispersive in optical systems, meaning that signals of different frequencies travel at different velocities. Another fundamental difference is that the nonlinear cross coupling between intensity and phase occurs along the fiber, whereas in radio systems, there is no such distributed nonlinearity. In contrast, nonlinearities in radio systems are highly localized, being caused by a very few discrete nonlinear elements. Each such localized nonlinearity is readily compensated using a discrete compensating nonlinearity. This method is not feasible in an optical fiber system, as the fiber nonlinearity interacts with the dispersion in a complex distributed manner. Hence most cross coupling or ICI in radio systems can be modeled and pre or post compensated, whereas this is not effective for optical ICI. Also, notably the bit rates in radio systems are lower and so there is more time within the bit period, for complex processing techniques. Hence where the reach performance is limited by optical nonlinearity in the fiber, current practice is to minimise nonlinear interaction between channels by spacing the channels in frequency and using chromatic dispersion to minimise the nonlinear interaction/cross coupling (by walk-off/dephasing). Where the modulation format uses multiple-phases (such as QPSK), it is currently necessary to reduce the operating power levels to minimize the impairments due to nonlinear coupling between these nominally orthogonal phase channels.

As a low power level limits the reach of the systems or increases the bit error rate, such nonlinear interactions remain a problem.

SUMMARY OF THE INVENTION

It is an object of the present invention to provide improved apparatus and methods.

According to a first aspect of the present invention, there is provided a transmitter for an optical transmission system arranged to transmit onto an optical transmission path, an optical sub carrier multiplexed signal comprising a number of sub-carriers in a band, the path having impairments causing differing error rates for different ones of the sub-carriers, the error rates contributing to an aggregate error rate for the band, and the transmitter being arranged to selectively differentiate the sub-carriers to reduce differences between the contributions to the aggregate error rate.

An advantage of such a system is that it can increase a tolerance of the aggregate error rate to the impairments. This increased tolerance can occur because no longer is the aggregate error rate dominated by errors from a small proportion of the sub-carriers. This means the margins allowed for all the sub-carriers need not be dictated by the worst performing of the sub-carriers. Such increased tolerance can enable margins to be reduced or enable greater reach or greater capacity for example. Costs of optical components such as dispersion compensators can be reduced if they can be dispensed with, or made to lower specifications. Where the impairments limit the transmission power and thus the reach, the invention can enable the transmission power to be increased, for a given aggregate error rate. The selective differentiating can in principle be predetermined and/or modified dynamically using real measurements of error rates.

Impairments such as nonlinearity cause more errors in subcarriers near the centre of an extended spectrum, whereas impairments such as dispersion can have different effects. Chromatic Dispersion can cause skewing of the subcarriers, so if no compensation of Chromatic Dispersion is attempted or if the cyclic prefix is shorter than the maximum delay spread, the outer channels experience the greatest error in alignment, hence increased eye closure at the receiver and hence higher error rates (due to CD). Furthermore both Polarisation Dispersion and Chromatic Dispersion in a direct detection system, can result in nulls elsewhere within the spectrum. The transmission conditions and format can be adapted to compensate for nulls which are neither at the edge or the centre of the spectrum.

Sub-carriers are defined here as a number of signals (typically modulated with information) which are modulated onto a single carrier (e.g. that provided by a single laser). They therefore have a defined phase relationship within the resultant (optical) signal. This is in contrast to the addition of multiple signals from independent carriers (such as in a WDM system).

As an additional feature for a dependent claim, the transmitter is arranged to selectively differentiate the sub carriers by using different power levels.

This is a relatively straightforward way of altering the error rate. Lower power can lead to more errors from noise, and higher power can lead to more errors from non linearities. In many cases it is desirable to maximize the power level which can be transmitted, for a given aggregate transmission quality (e.g. error rate). For example for systems in which chromatic dispersion dominates, it can be advantageous to turn up the power of the outer sub-carriers to reduce the effect of noise and hence open up the eye at the receiver for these sub carriers. Polarisation dispersion can impair any sub carrier so the power of the most impaired anywhere in the band can be compensated similarly, if the control loop can operate as fast as the PMD effects. In some cases such as long systems where the fibre is exposed to mechanical perturbations, this may not be possible due to the transit time for the feedback signal from the receiver to the transmitter being greater than the fraction of a second or millisecond time scale of the PMD effects. Nonlinearity increases the error rates of sub carriers near the center of the band, and so it can be advantageous to compensate by having higher power levels for such inner sub-carriers.

Magnitude differences, by pre-emphasis can be termed spectral shaping, and reduce the impact of non linearities in two ways:
a) Higher input powers may be launched for a given transmission distance and fiber type compared to systems without such spectral shaping, if the non linearities are what limit the launch power. Launching higher power in this way can enable greater overall system reach, or less amplification, or more power budget for losses in components such as add drop multiplexers along the optical path.
b) Spectral shaping can reduce sensitivity for the demultiplexed SCM channel towards WDM impairments from neighbouring channels, compared to WDM SCM transmission without spectral shaping. WDM SCM interactions (inter-channel impairments) can be reduced by spectral shaping, to an extent (where WDM channel spacing is the typical 50 or 100 GHz spacing for WDM channels). As the WDM channels get closer to each other and in the limit the channels are all packed together, the nonlinear interaction profiles would change and this effect would be less apparent.

As another such additional feature, the transmitter is arranged to selectively differentiate the sub carriers by using different modulation schemes. This enables different information transmission rates to be transmitted, by using different numbers of bits per sub-carrier per symbol for example, though the symbol length should be the same for all sub carriers.

As another such additional feature, the transmitter is arranged to selectively differentiate the sub carriers by using different amounts of error correction. As error correction involves sending redundant information, this is another way of varying the information transmission rate.

Another such additional feature is the power levels being arranged to provide a signal power spectrum which is higher near a centre of the band than near an edge of the band.

An advantage is that the degradation of the signal to noise ratio by the non linearities can be counteracted by this. This is essentially because the non linear impairments generated by the ensemble of sub-carriers are greater in the centre of the band because of the nature of inter-subcarrier nonlinear interactions due to the Kerr effect.

Another such additional feature is the power levels being arranged to provide a signal power spectrum which is lower near a centre of the band than near an edge of the band.

This can enable compensation for impairments generated by CD.

Another such additional feature is the band comprising one or more unused sub carrier frequencies arranged nearer a centre of the band than an edge of the band. An advantage is that it is easy to incorporate this with little alteration of other parts. Conventionally such gaps in bands of sub-carriers are avoided as they usually mean loss of capacity or added expense in making modulator and other electronics or optical components require wider bandwidth.

An advantage is that this can enhance the improvement in dealing with the non linearities. Introducing a gap will inherently increase the overall spectral extent of the band if the information density is kept the same in other sub-carriers. As a greater spectral extent contributes to reducing the aggregate effect of non linearities, a gap is useful and perhaps the simplest way of differentiating the power or redistributing the information in the band. If the spectral extent is limited, e.g. to the bandwidth of a modulator, it may be preferable to distribute the information more uniformly across the band. A gap has the effect of reducing the information content at the center, where the impairments from non linearity can be greatest. It can be combined with increasing the power of the remaining sub carriers near the center when nonlinearity dominates, to improve the BER.

As another such additional feature, the transmitter is arranged to modulate the data to provide a data density which is lower near a centre of the band than near an edge of the band.

Again this is another way of addressing or exploiting the fact that the effects of the non linearities are not spread evenly across the sub-carriers. It can help because sub carriers with lower data density can tolerate a lower ratio of signal power to unwanted nonlinearly generated power, for a given error rate.

As another such additional feature, the transmitter is arranged to modulate the data across the different sub-carriers using more than one modulation format.

Again this is another way of addressing or exploiting the fact that the effects of the non linearities are not spread evenly across the sub-carriers.

Another such additional feature is an arrangement for dynamically altering the sub-carriers on the basis of measured error rates, to reduce differences in the error rates.

As another such additional feature, the transmitter is arranged to use orthogonal frequency division multiplexing.

This has advantages for optical transmission since other optical impairments such as chromatic dispersion are easily handled. However, it is particularly affected by optical non linearities as the sub-carriers are overlapped Another such additional feature is an electronic circuit for altering the magnitudes of the sub-carriers relative to each other before conversion to an optical signal.

An advantage of this is that it can be incorporated easily with other electronic circuitry, such as Fourier Transform circuitry in an OFDM transmitter. If done in the analog domain after any conversion from digital signal, then an increase in quantization errors in conversion from digital electronic signals can be reduced.

Another such additional feature is an optical filter for altering the magnitudes of the sub-carriers relative to each other.

An advantage of adjusting in the optical domain is that an increase in quantization errors in conversion from digital electronic signals can be reduced, and the filter can be implemented more cost effectively, especially if it can be incorporated with other optical filtering. For example, a WDM multiplexing filter could have this extra feature instead of being substantially flat across the signal bandwidth. This can of course be combined with electronic alteration.

Another aspect of the invention provides a transmitter for an optical transmission system, the transmitter being arranged to transmit an optical sub carrier multiplexed signal comprising a number of sub-carriers, onto an optical transmission path, the transmitter being arranged to modulate the sub-carriers with data differently for different ones of the sub-carriers.

This has advantages including that the data can be transmitted with greater overall spectral efficiency for example or with lower aggregate bit error rates An additional feature is the data being modulated so that different ones of the sub-carriers have different data densities.

This is one way of providing the above advantages. An example is varying the number of levels in a multi level format.

As another such additional feature, the transmitter is arranged to provide different relative power levels of the sub-carriers.

This enables the overall power to be reduced and thus reduce the effect of the non linearities over all the sub carriers, or to maximize the power for a given aggregate error rate, as desired.

Another aspect provides a system comprising the transmitter and a receiver, the receiver having an adjuster for adjusting the power levels of the sub carriers to reverse the differentiation of power levels applied at the transmitter.

Without this, the different power levels could contribute to an increase in aggregate error rate by increasing quantization errors or other errors in the receiver.

Another aspect provides a receiver for an optical transmission system, for receiving an optical sub carrier multiplexed signal comprising a number of sub carriers in a band, and having an adjuster for adjusting power levels of the sub carriers.

This can be useful either to reverse the effect of any power level differentiation in the transmitter, or for other reasons such as to alter the effect of quantization errors in a subsequent digitization step in the receiver. Otherwise the quantization errors could be uneven across different sub carriers, and accentuated in sub carriers having lower magnitudes. In most cases, it would be desirable to make the quantization errors even across all sub carriers, though if desired, some preferred sub carriers could be given a lower quantization error. Another purpose of such adjusting could be to carry out pre emphasis to the sub carriers to compensate for the effect of optical non linearities in a subsequent optical component in the receiver such as an optical amplifier, A to D conversion or CD compensation components for example.

As another such additional feature, the sub carriers of the received optical signal having different power levels, the adjuster at the receiver being arranged to adjust the magnitudes to reduce the differences.

As another such additional feature, the receiver is for receiving sub-carriers having power levels higher near the center of the band, the adjuster being arranged to reduce the power levels of those sub carriers near a center of the band.

This is directed particularly at compensating for nonlinearities in the transmission path.

Another aspect provides a receiver for receiving an optical sub carrier multiplexed signal comprising a number of sub carriers, with different ones of the sub-carriers being modulated with data differently, the receiver having a demodulator for demodulating the different sub carriers.

This can enable different information densities and different susceptibility to noise. This can be used to enhance reliability of some sub carriers, or to even out the error rates across the sub carriers for example.

Another such additional feature, is an adjuster for adjusting magnitudes of the sub carriers.

Another aspect provides a transmitter for an optical transmission system arranged to transmit an optical sub carrier multiplexed signal comprising a number of sub carriers in a band of adjacent sub carrier frequencies, onto an optical transmission path, the sub carriers having different power levels, those which are near a centre of the band having higher power levels than those near an edge of the band.

Another aspect provides a sub carrier element for an optical communication system arranged to carry data on a number of sub carriers, the element being arranged to alter relative power levels of the sub carriers.

This can be useful at the receiver side or transmitter side, or both.

Another aspect provides a method of transmitting an optical sub carrier multiplexed signal comprising number of subcarriers in a band of adjacent sub carrier frequencies, onto an optical transmission path, the sub carriers having a signal spectrum which is higher near a centre of the band than near an edge of the band.

The SCM or OFDM waveform can be modulated onto an optical carrier using an inphase and quadrature modulator and can be received with a coherent receiver in inphase and quadrature parts. Such a system will map each subcarrier to a unique part of the optical spectrum. The sub-carriers can be tailored in terms of amplitude, modulation scheme and also in terms of applied coding using a coherent modulation scheme.

Another aspect provides a method of offering a communications service over a system having the transmitter.

The value of such services can increase owing to the advantages of the invention. Such increased value over the life of the system, could prove far greater than the sales value of the equipment.

Software for a transmitter as set out above, the software being arranged to generate an optical sub carrier multiplexed signal comprising number of sub-carriers in a band of adjacent sub carrier frequencies, the sub carriers having a signal spectrum which is higher near a centre of the band than near an edge of the band.

This acknowledges that software can be a valuable, separately tradable commodity. The software can be stored on a computer readable medium for this purpose. It is intended to encompass software, which runs on or controls "dumb" or standard hardware, to carry out the desired functions. For similar reasons, it is also intended to encompass software which "describes" or defines the configuration of hardware, such as HDL (hardware description language) software, as is used for designing silicon chips, or for configuring universal programmable chips, to carry out desired functions.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which.

DETAILED DESCRIPTION OF PREFERRED EMBODIMENTS

Figure 2:
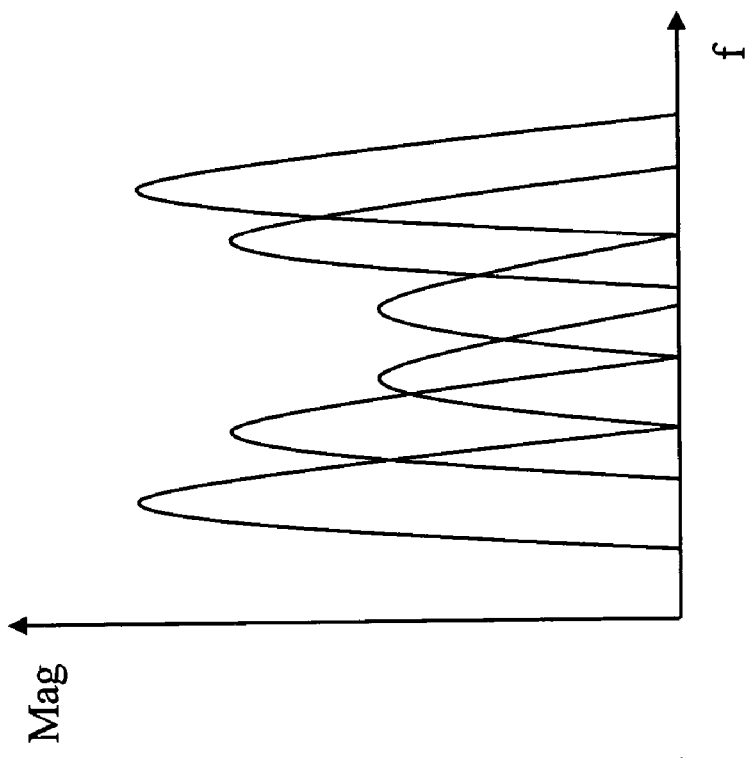
FIGS. 2 to 5 show graphs of sub carrier magnitudes with pre emphasis, according to embodiments of the invention.

The embodiments described involve optical communication utilising Sub carrier Multiplexing (SCM) and digital signal processing. This will now be described by way of introduction to the embodiments. The use of SCM transmission in an optical communication system can allow the symbol rate to be reduced, thus increasing tolerance to Chromatic Dispersion (CD) and Polarisation Mode Dispersion (PMD), allowing increased reach. Furthermore the use of digital signal processing can reduce the need for many sets of apparatus at the transmitter to generate the sub-carriers, compared to analogue SCM generation techniques, and can reduce the guard bands conventionally required between sub-carriers, and hence improve spectral efficiency.

Digital signal processing in the receiver can enable the sub carrier spacing to be reduced, such that the sub-carriers overlap, thus improving spectral efficiency. Sub-carriers are spaced at an integer multiple of 1/(the symbol period of the sub-carrier multiplexed signal) and by integrating over the symbol period in the receiver adjacent sub-carriers appear orthogonal and hence do not interfere, even though they overlap. For example with a typical configuration the sub carrier spacing may be 3.3 GHz, compared to tens of GHz for an analogue SCM system. Modulation formats with the sub-carriers spaced at an integer multiple of 1/(the symbol period of the sub-carrier multiplexed signal) are henceforth referred to as Orthogonal Frequency Division Multiplexed (OFDM) modulation formats.

It will be understood that OFDM modulation is a specific implementation of SCM modulation, and in this document the term SCM, and cognate terms, are intended to include OFDM. Tolerance to CD and PMD can be further improved via the use of guard intervals at the beginning of each symbol. Due to its location at the start of the symbol period, the guard interval suffers any inter-symbol interference due to dispersive effects, such as CD and PMD, and protects the data carrying portion of the symbol. The guard interval can be discarded at the receiver, thus removing the impact of dispersion on the received data symbols. The guard interval is a period of time added to each symbol, which is distinct from the guard band, which is a frequency space required between each sub carrier in some sub carrier multiplexed systems. In this document, references to the symbol period of the sub-carrier multiplexed signal mean the basic symbol period excluding any guard interval which may be used.

In addition to the increased tolerance to CD and PMD due to the increased symbol period, further advantage can be gained due to the frequency-domain properties of PMD. The effect of the degradation due to PMD, against optical frequency is random, and changes over time, with a characteristic period of tens of milliseconds. Since each sub carrier is located at a different optical frequency, it is degraded by a different amount to the other sub-carriers in a given composite signal.

Forward Error Correction (FEC) can be used to enable errors imparted on data during transmission to be detected and corrected, by transmitting additional information along with the data. The error correction ability of FEC codes can be improved if bits of known poor quality are declared as erasures to the decoding system. Channel state information can be utilised to monitor the performance of each individual sub-carrier, and thus the system is aware of the relative performance of each sub-carrier. The characteristic period over which the spectral shape of PMD degradations evolve is tens of milliseconds, thus the channel state information can easily track the current state of each carrier. It is possible to determine which bits of data have come from which carriers, and thus data from carriers which are known to be of poor quality can be declared to the FEC decoder as erasures, thus improving the performance of the error correction system.

Non-linear effects such as cross-phase modulation and self phase modulation may cause a loss of orthogonality between sub-carriers. This is a deterministic effect and as such Maximum Likelihood Sequence Estimation (MLSE) decoding can be applied in parallel across the composite signal to further improve system performance. The use of MLSE decoding in closely coupled channels is discussed in co-pending U.S. application Ser. No. 10/425,809 hereby incorporated herein by reference.

Optical communications utilising SCM and FEC coding would generally involve at the transmitter first applying the FEC coding to the incoming data. This is then passed to a SCM coding system. The digital composite signal is generated utilising a Fourier transform. The various frequency components are used to modulate different ones of the sub carriers. The SCM signal or signals is converted to one or more analogue signals and applied to an optical carrier utilising an optical modulator or modulators. At the receiver, after transmission along an optical path, the optical signal is converted back to the electrical domain before being converted to a digital signal. Channel state information is extracted from the data, which is used by the decoding system to improve the performance of error detection and correction. A Fourier transform is applied to the signal, to generate a substantially parallel stream of symbols. FEC codes applied at the transmitter can be utilised to decode the symbols, in conjunction with channel state information. The output from the decoder is serialized to produce a substantially serial data stream, of a comparable format to that input to the transmitter.

The choice of number of sub-carriers is an important parameter in the system. The trade-off is between speed and complexity of the electronic Fourier transform system. As the number of carriers increases the parallelism and complexity increases, however the speed of operation required reduces. For example for a 10 Gb/s signal between 8 and 32 sub carriers may be utilised, however more or fewer may be used as the performance of electronics develops. A further variable is the modulation format applied to each of the sub-carriers. In the example above binary modulation was used, however higher-order formats are possible, thus increasing the number of bits conveyed by each symbol. In general any conventional modulation format can be utilised. If phase modulation is utilised either absolute or differential encoding can be performed. If absolute coding is used a reference phase is transmitted at regular intervals as part of a synchronisation symbol. This reference phase is then used by the receiver to decode the symbols.

Such optical SCM or OFDM transmission does not introduce any spectral shaping to minimise the impact of distortion due to signal interaction with fiber nonlinearities. The composite signal comprises the sum of the individual sub carrier optical fields. This produces a waveform with a noise-like power envelope, and a high ratio of peak to mean signal power. Kerr effect nonlinearity in the fiber induces a phase shift in the signal which is proportional to the instantaneous signal power. In the absence of chromatic dispersion, this distortion is, in principle, readily compensated at either transmitter or receiver. More usually, linear chromatic distortion induces substantial changes in the waveform envelope as the signal propagates, so that the locally induced Kerr effect phase shift also varies along the fiber, and is itself modified by chromatic dispersion during subsequent propagation to the receiver. The resultant distortion is not easily compensated, and can be treated as an additional optical noise at the receiver.

In the case where an OFDM signal with similar optical powers across all sub-carriers is launched down a length of fiber to provide appreciable nonlinear degradation, the highest error counts in the received signal are found to occur for sub-carriers near the centre of the OFDM spectrum for a given band of sub-carriers.

Hence the largest contributions to OSNR (optical signal noise ratio) degradation are deduced to occur for sub-carriers at the centre of the OFDM spectrum. The described embodiments of the invention can help reduce the performance degradation of optical OFDM systems due to fiber nonlinearities.

In one example, by introducing gaps carrying no signal power in the centre portion of an OFDM signal, the impact of fiber nonlinearities may be reduced. Gaps in the OFDM frequency spectrum may be introduced in various ways for a given transmission capacity. The overall OFDM signal bandwidth) may be increased slightly to introduce larger gaps in the middle portion of the spectrum, whilst using the same sub carrier number and modulation technique across all sub-carriers. In another scenario, the OFDM spectrum may consist of mixed capacity transmitted signals whilst retaining the same OFDM signal bandwidth as the conventional OFDM transmission. Sub-carriers at the outer portion of the OFDM spectrum which suffer from less nonlinear penalties may be modulated using a higher spectral efficiency (such as 16-QAM in the example) whilst the inner sub-carriers may be modulated using less spectral efficient techniques. In addition, the power distribution between the mixed capacity signals may be varied.

Alternatively, gaps in the spectrum can be introduced by means of modulating OFDM spectra onto carriers, which are separated in frequency by more than the bandwith of the OFDM spectrum. The RF carriers are then modulated onto the optical carrier using a directly modulated optical source or an optical source and an external modulator. The use of sub-carrier modulation is described in more detail in the above referenced pending US and international patent applications ref 16231ID.

Figure 1:
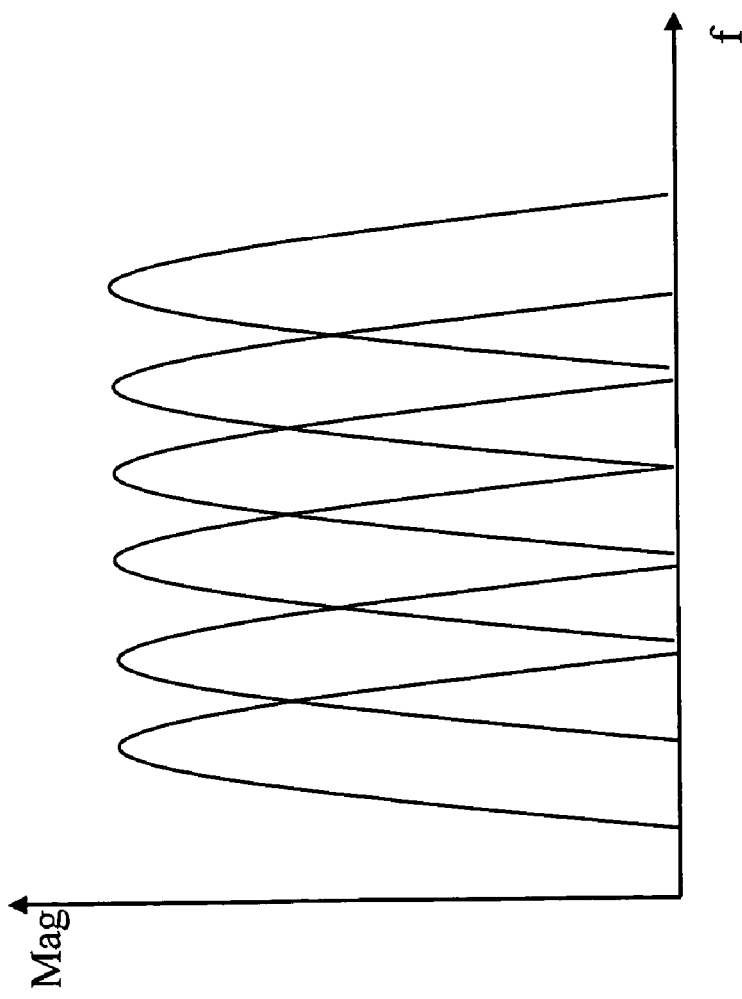
FIG. 1 shows a graph of an OOFDM system without spectral shaping, for comparison, where the vertical axis represents optical intensity and the horizontal axis represents optical frequency

FIG. 2 shows a graph of magnitude versus frequency for each of the sub-carriers separately making up the transmitted optical sub carrier multiplexed transmission signal. It shows the effect of an embodiment of the invention, using similar parameters to that of FIG. 1 for the sake of comparison. Each curve has a peak which is effectively the sub carrier power or magnitude. The overall spectrum would be a combination of these individual curves. The curves overlap, as is the case in an OFDM signal for example. The magnitudes differ from each other as can be seen in comparison to FIG. 1. Various spectral shaping effects can be achieved by varying the magnitudes. In this case, 6 sub-carriers are shown forming one band, and the magnitudes are lower in the centre of the band. The amount of variation in magnitudes can be chosen to achieve an optimum aggregate signal quality (e.g. Bit Error Rate) for a given total power, or vice versa, for a particular bit rate and reach. Alternatively the aggregate bit rate may be optimized. The optimum will be a good trade off between reduction in noise from optical non linearities and data capacity and reach and other parameters. The dip in power levels near the center of the band should be suitable for systems where CD dominates. Alternatively, the power levels can be increased near the center of the band, to suit systems in which optical non linearities dominate.

Figure 3:
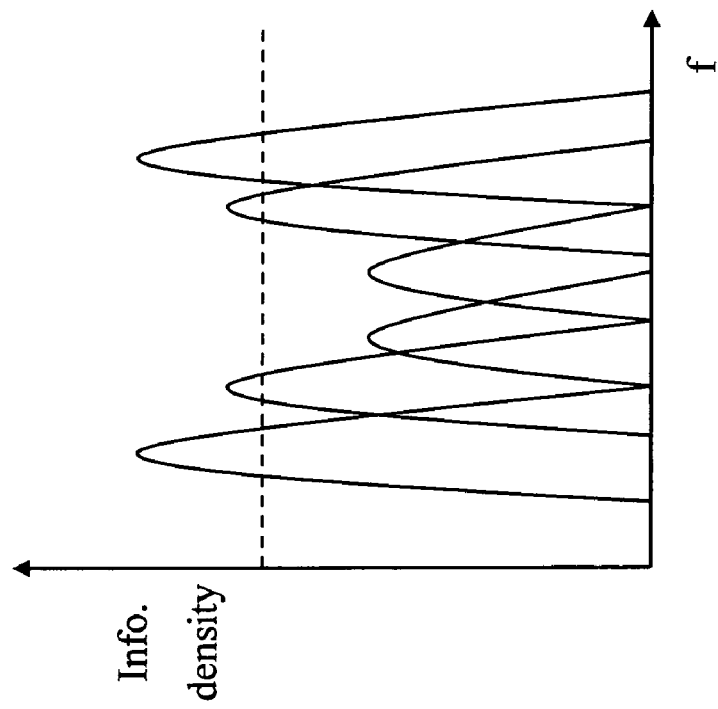
Figure 4:
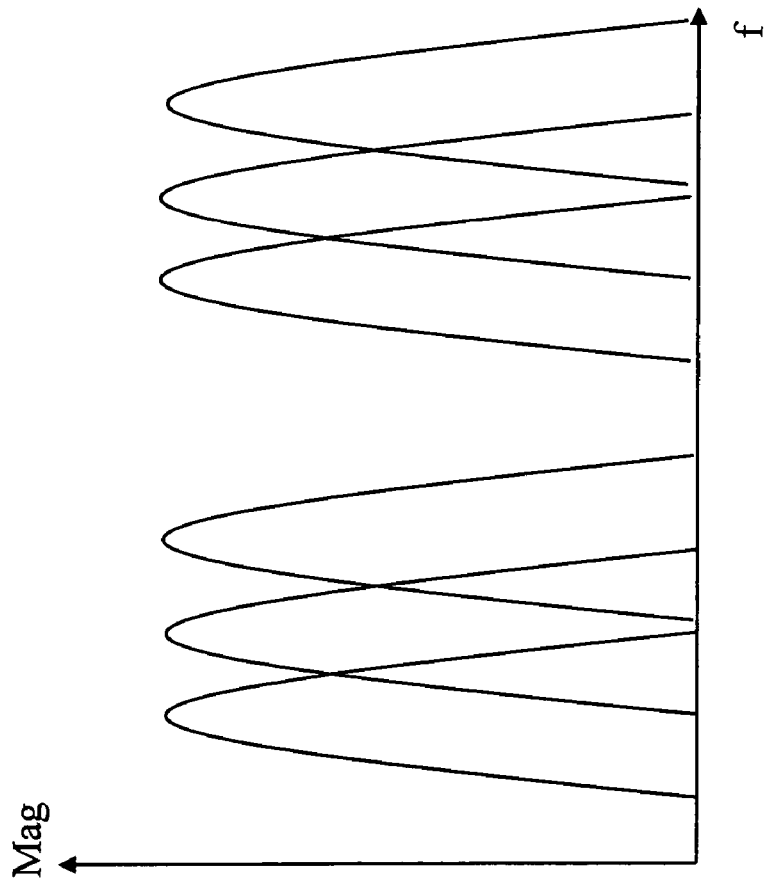
Figure 5:
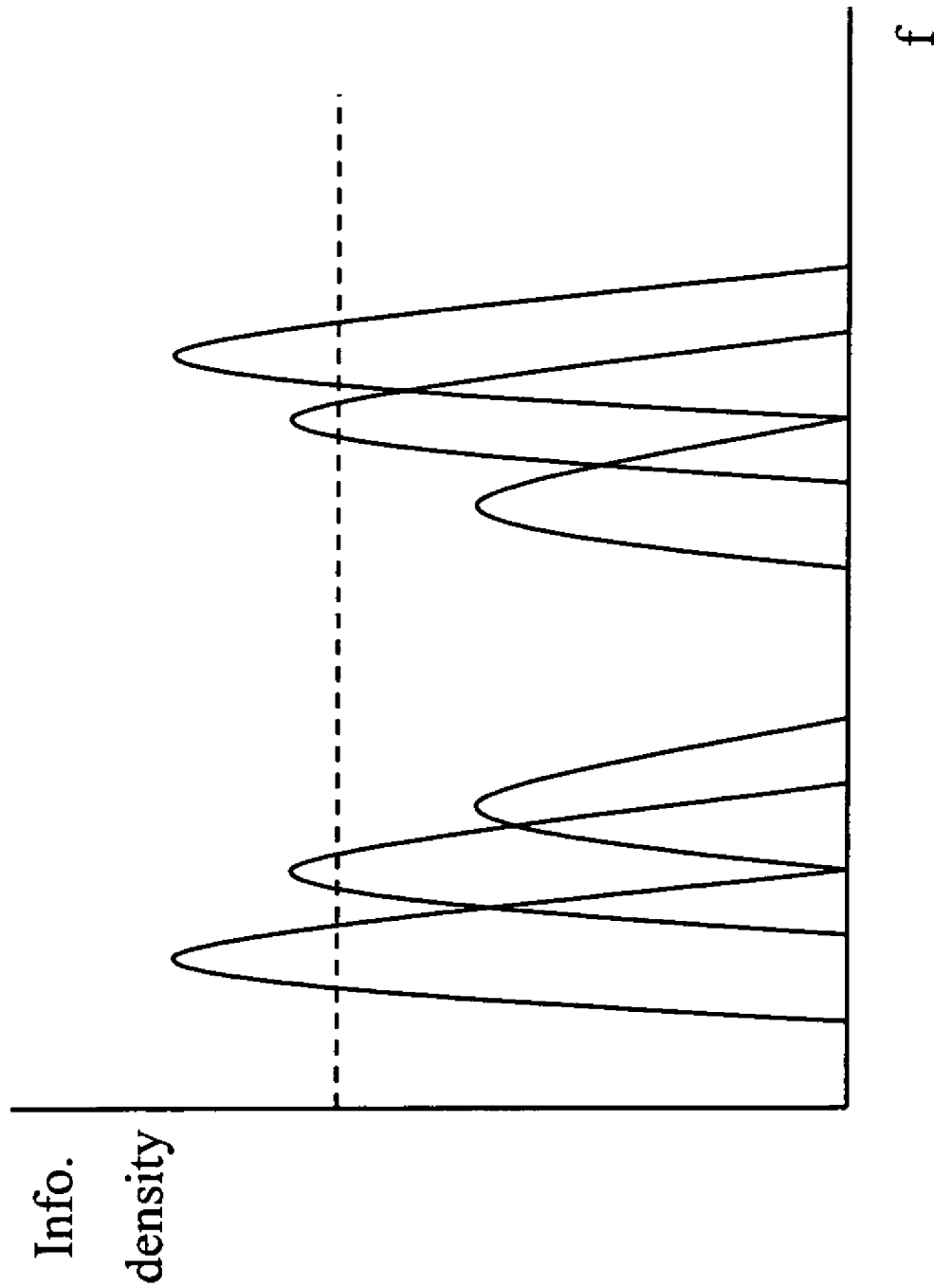

FIG. 3 shows another example according to another embodiment of the invention. In this case the figure is also similar to FIG. 2 but instead of a dip in the centre of the band, a gap has been introduced at or near the centre, to achieve corresponding advantages. In FIG. 4 another example is shown according to another embodiment. In this case the effect of varying the information (info.) density is shown. This can be carried out instead of or as well as a variation in magnitude as shown in FIGS. 2 and 3. In FIG. 5, the variation in information density is combined with a gap near the centre of the band. This shaping can be achieved either by generating an OFDM spectrum in a single IFFT operation, with the central subcarriers set to zero amplitude, or alternatively by the generation of two separate OFDM spectra which are separately modulated onto electrical carriers. The spacing and consequent gap size, can then be adjusted, within the constraints of the optical modulator, while using the full digitized bandwidth to carry data.

Figure 6:
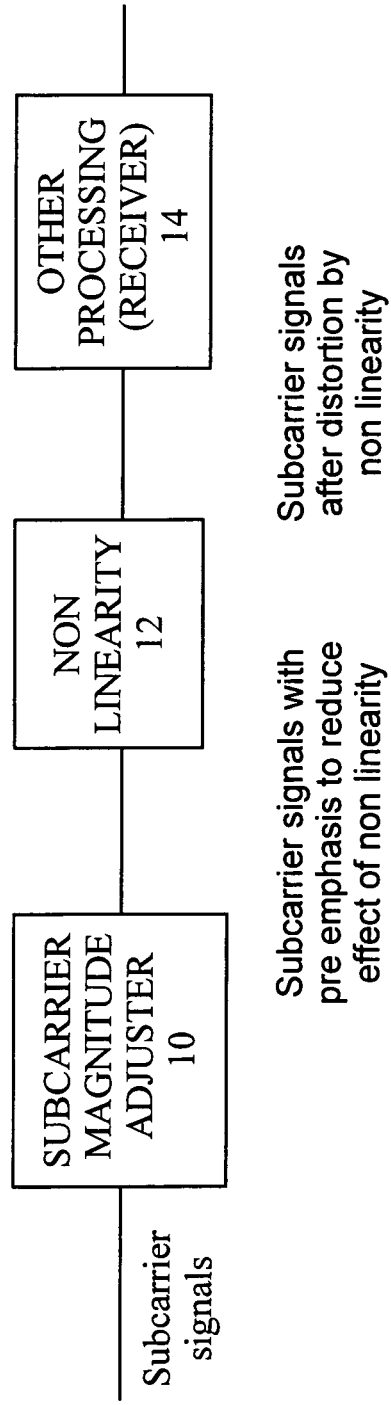
FIG. 6 shows an arrangement having subcarrier magnitude adjustment according to an embodiment.

FIG. 6 shows an example of a series of components for a communication system according to an embodiment of the invention. This can be used in a receiver or a transmitter or other parts either before or after a source of non linearities in the communications path. Subcarrier signals are fed to a subcarrier magnitude adjuster 10. This outputs subcarrier signals with pre emphasis to reduce the effect of a non linearity in the optical path or in an optical component in the receiver such as optical amplifiers, dispersion compensators for example. The non linearity is shown as item 12. After the subcarrier signals have been distorted by the non linearity, further processing 14 can be carried out such as decoding in the receiver, knowing that the distortion from the non linearity has partially been compensated or mitigated by the subcarrier pre emphasis, such as by differentially weighting the received subcarrier magnitudes to reverse the pre emphasis applied in the transmitter.

Figure 7:
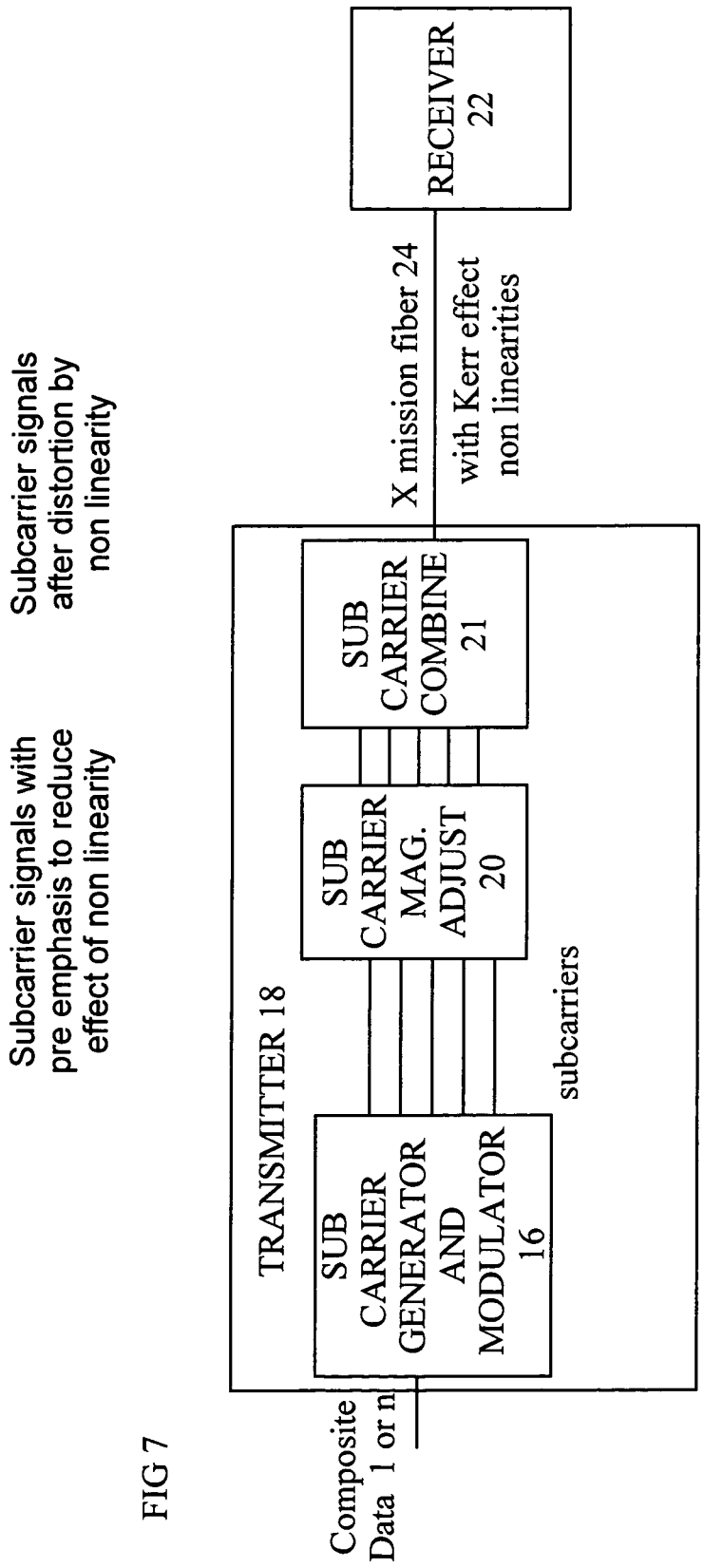
FIG. 7 shows a transmitter having subcarrier magnitude adjustment according to an embodiment.

FIG. 7 shows an embodiment having a transmitter 18 and a receiver 22, coupled by a transmission fiber 24. The fiber has non linearities based on the Kerr effect. The transmitter has a sub carrier generator and modulator 16 for receiving 1 or n streams of composite data. Composite data means that they could all form part of a single data stream.

This part outputs a number of sub carriers modulated with the data, or in the case of OFDM, with Fourier transformed components of each symbol spread across the sub carriers. This part can also optionally add FEC information to the data, with different amounts for different sub carriers, instead of or as well as the magnitude differences. A sub carrier magnitude adjuster 20 is provided to adjust the magnitude of some or all of the sub carriers. The pre emphasis can alternatively be provided by missing out some sub carriers or providing different modulation formats to vary the information density, as shown in FIGS. 2-5 or otherwise. A sub carrier combining unit 21 combines the subcarriers for transmission. At the receiver, at least some of the effect of the non linearities is compensated by the pre emphasis of the subcarriers. At the receiver the error rates can be measured for each sub carrier and results fed back to the transmitter, to enable the differentiation of the sub carriers to be dynamically adjusted. Or the differentiation can use predetermined values calculated or measured at installation time.

Figure 8:
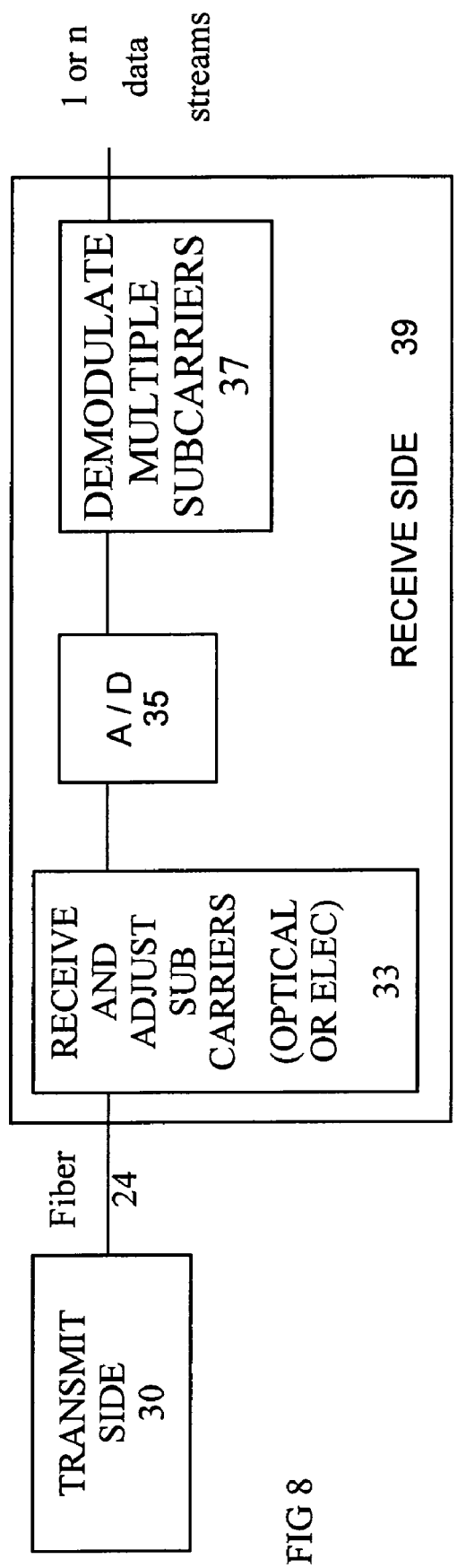
FIG. 8 shows a receiver having subcarrier magnitude adjustment according to an embodiment.

FIG. 8 shows an embodiment in which adjustment is carried out at the receiver. SCM signals are sent from a transmit side 30 along fiber 24. At a receiving side 39, the subcarriers are adjusted by part 33. This can be before or after conversion to electrical domain from optical domain. There are at least two advantages or purposes for such adjustment. One is to restore an even magnitude to the subcarriers if they underwent adjustment at the transmitter. This can be useful to reduce the effect of quantization errors by a subsequent A/D 35, which would otherwise be uneven across different subcarriers, and accentuated in subcarriers having lower magnitudes. A second advantage would be to carry out pre emphasis to the sub carriers to reduce the effect of optical non linearities in some component in the receiver such as optical amplification, A to D conversion or CD compensation (not shown). At item 37, the subcarriers are demodulated to recover the 1 or n data streams transmitted. Of course many other elements not shown may be present.

Figure 9:
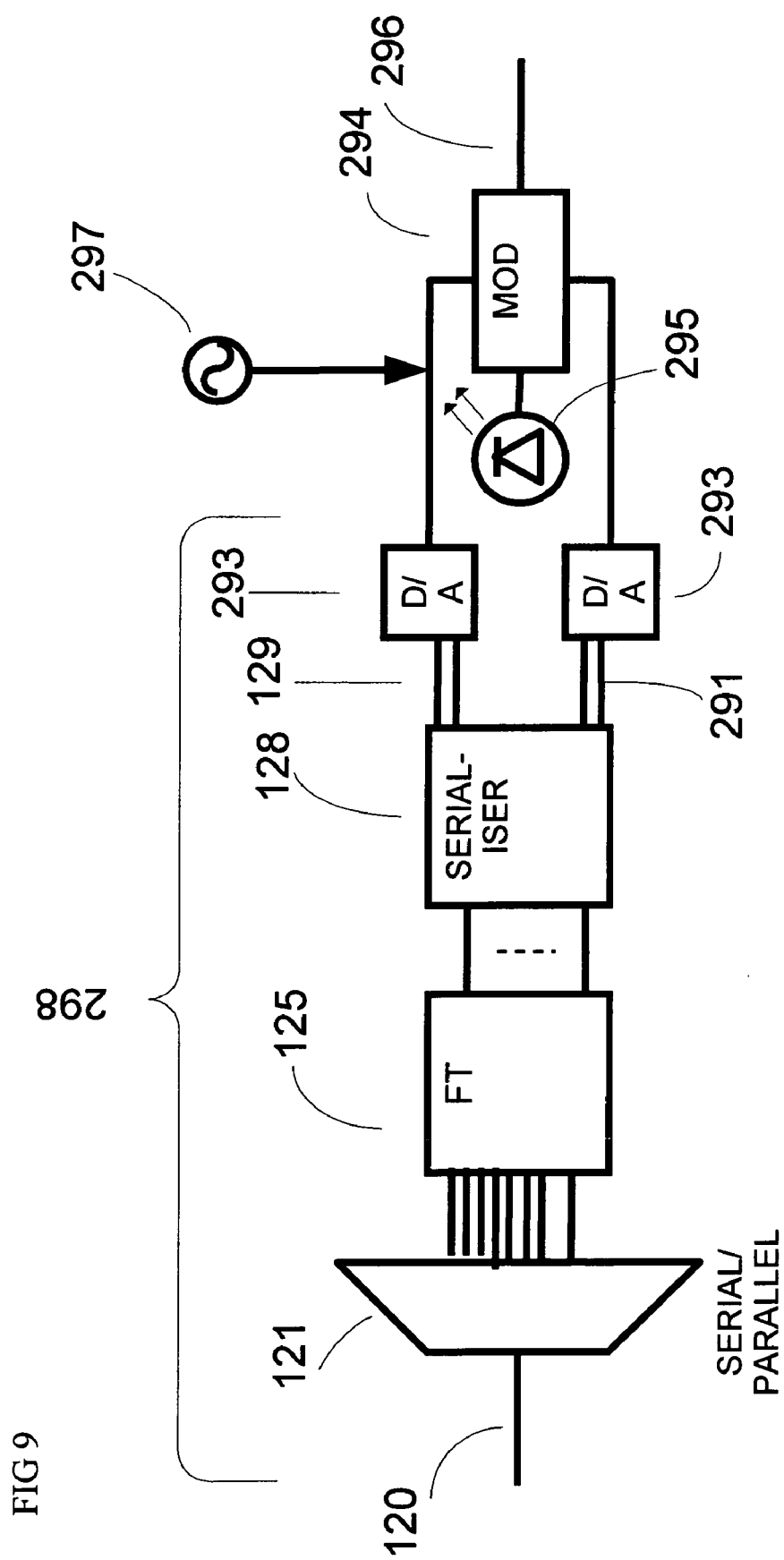
FIGS. 9 to 11 show more examples of a transmitter having subcarrier magnitude adjustment according to embodiments.

FIG. 9 is a block diagram showing an example of parts of a transmitter according to an embodiment of the present invention. This example has an input 120 carrying a signal with a data rate of 10 Gb/s (100 ps per bit), and utilises a composite signal with four sub-carriers, each with quadrature modulation. Item 298 indicates parts which can be carried out by digital signal processing circuitry. Firstly the data is deserialised and coded in a coder 121. This could be in the form of phase-encoding (such as QPSK, DQPSK) or a combination of phase-amplitude encoding (such as 16-QAM, 32-QAM). The data is deserialised into a parallel data stream, with the number of parallel bits being defined by the number of subcarriers, and the modulation format of each sub-carrier. In this example eight bits are required in parallel (two bits per sub-carrier, four sub-carriers).

The data for each sub carrier is then mapped to a complex binary number, according to the chosen modulation format. A complex number is typically represented by two orthogonal components, referred to as 'I' and 'Q', and this convention is utilised in this description. For the purposes of the description only, 8-bits will be utilised to represent 'I' and 8-bits to represent 'Q', however different numbers of bits may be chosen depending on the requirements of the system as will be apparent to those skilled in the art.

In this case, the quadrature keyed signal, has four possible data states (00, 01, 10 and 11). If '01' is to be represented on one of the sub-carriers, I='00000000' and Q='11111111' is output on the relevant output for that subcarrier. The number of pairs of words output in parallel is defined by the number of sub-carriers, with each I and Q pair corresponding to one sub-carrier. In this example, eight parallel words will be output—I and Q for each of the four sub-carriers. Each word consists of 8-bits, therefore 64-bits are output every 800 ps.

The parallel data is then passed to a Fourier transform FT unit, 125. This performs one Fourier transform on each set of parallel input data. The output of the Fourier transform will have the same format as the input, so for our example eight 8-bit words will be output in parallel. The Fourier transform function is also commonly referred to as an Inverse Fourier transform, however both terms have the same meaning in this document.

Each pair of I and Q words output from the Fourier transform represents one time-segment of the symbol to be transmitted, in our example each pair represents 200 ps of the total 800 ps symbol length. Since the sub carrier signals are now separately available, they can have their amplitudes adjusted here at the output of the FT or later. It may be more difficult to adjust the magnitudes later after serializing or conversion to analog form. Another way to achieve the pre emphasis would be to alter the information density by altering the number of bits per symbol on selected ones of the subcarriers at the output of the FT for example.

In order to generate the required transmitted waveform, the output of the Fourier transform may be serialised, by multi-bit serialiser 128. In this example the multi-bit serialiser 128 will take 64-bits in, in parallel every 800 ps, and output two 8-bit words (one for I and one for Q) in parallel every 200 ps. Each of these words is then passed to an digital to analogue converter 293, the outputs of which are used to drive the I/Q optical modulator, 294, which modulates an optical carrier from a source, such as laser 295, to generate an optical sub carrier multiplexed signal, output on the optical output, 296. A reference tone 297 may be required at the receiver to enable decoding of the data, and this may be inserted at the modulator. The reference imparts a small depth modulation onto the optical output, which may be detected and recovered at the receiver.

An 'I/Q optical modulator' is an optical modulator which can modulate the amplitude and phase of an optical carrier, in response to an electrical input signal. A common way to implement an amplitude and phase modulator is to utilise two independent Mach-Zehnder modulators in parallel, one driven by the I signal and the other by the Q signal. The outputs of these two modulators are then combined, allowing an optical signal with amplitude and frequency defined by the I and Q inputs to be output.

As will be apparent to those skilled in the art there are other techniques allowing the modulation of both amplitude and phase of an optical carrier, and these are equally applicable to the present invention. For instance, a directly modulated laser (not shown) may be used in place of I/Q optical modulator 294 and laser 295. Such a directly modulated laser may be frequency tunable. These alternative techniques may require different drive signals to the I/Q signal described above, in which case additional processing may be performed in the digital signal processor to generate these signals.

Additional digital processing can also be carried out in addition to the actions described above to modify the transmitted waveform. For example both non-linearities in the modulator amplitude transfer function and linear frequency response limitations can be corrected using known signal processing techniques.

In order to receive the signal generated by the apparatus of FIG. 9, a coherent detection system is required—that is, the phase as well as the amplitude of the received signal should be detected. In other embodiments, as described in more detail in the above referenced pending US and international patent applications ref 16231ID, amplitude modulation formats may be used which means that an amplitude (intensity) modulator may be used in the transmitter rather than an I/Q modulator and that coherent detection is not required at the receiver. In one particular embodiment, the inverse Fourier transform unit transmitter may be arranged to produce a real part only output enabling amplitude modulation, as described in more detail in international patent application ref 16231ID. The use of amplitude modulation formats results in simpler and cheaper transmitter and receiver construction. Phase modulation formats may also be used, but this again requires phase modulation at the transmitter and coherent detection at the receiver.

FIGS. 10 to 15 are concerned with how to achieve pre emphasis by altering the information density, by varying the modulation format. This can be in combination with features and other embodiments described above, or as an alternative. It should be noted that the transmitted capacity may be distributed according to:

a) Degrees of freedom (refer to FIG. 11 described below)
b) Number of allowed transmitted symbols per subcarrier (dependent on modulation format)

Figure 10:
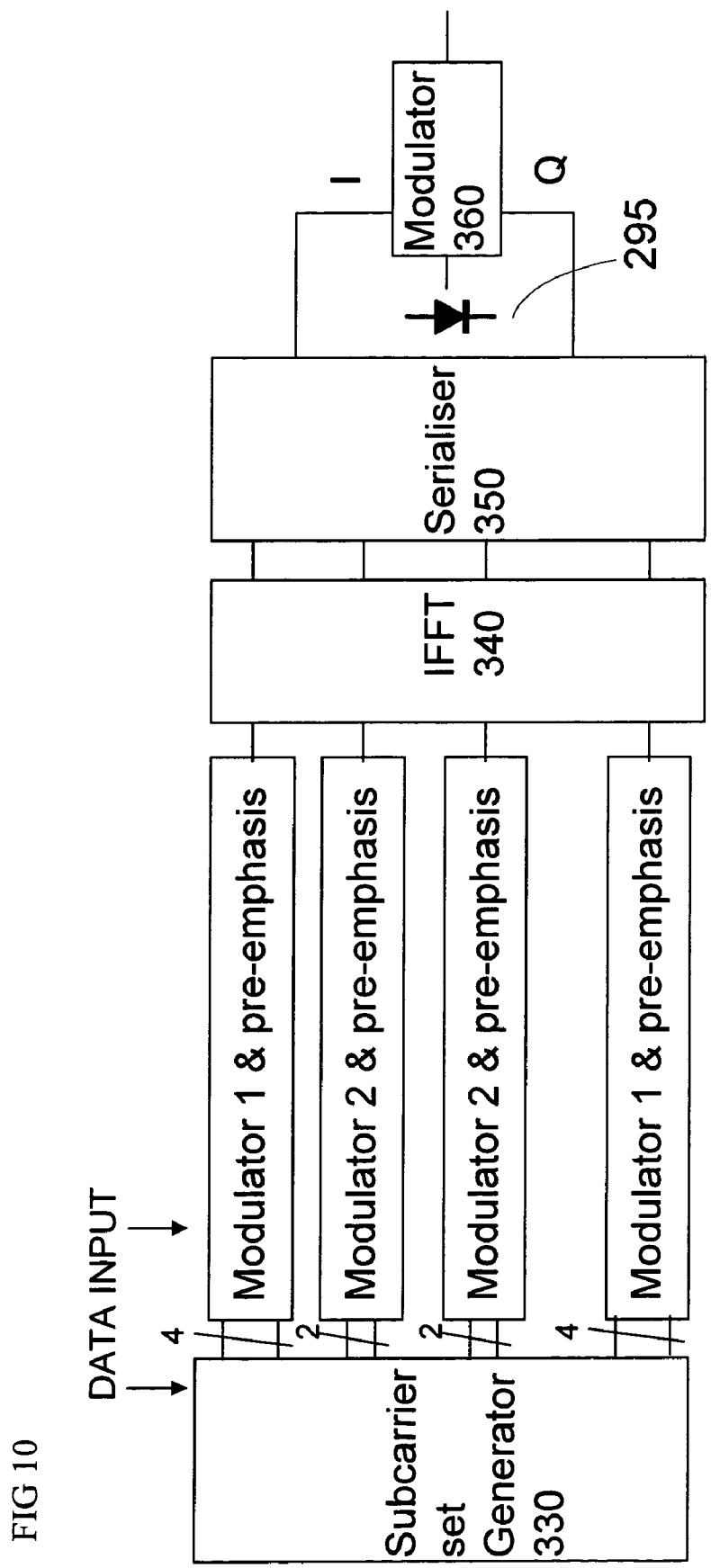

FIG. 10 shows an example showing only 4 transmitted subcarriers for 2 modulation formats (16QAM and QPSK) but this may extend to multiple subcarriers and more different modulation formats. As is well known, a data path only 1 bit wide can use BPSK, and for 2 bits QPSK can be used. A 4 bit scheme can use 16 QAM (with $2^4=16$ different states for each symbol). In FIG. 10, parts of a transmitter are shown. Incoming data is fed to a subcarrier set generator 330. A pair of first subcarrier streams, 4 bits wide (for 16QAM) and near the outside of the band of subcarrier frequencies are fed to a modulator of type 1 for producing modulated signals and providing pre emphasis inherently (since the different modulator types will have different information densities), or by altering the magnitude relative to other subcarriers. A pair of second subcarrier streams, closer to the centre of the band of subcarriers, are two bits wide (for QPSK) and hence can have a lower information density. These are fed to a modulator of type 2 to produce modulated signals with pre emphasis.

The modulated subcarriers are fed to subsequent IFFT (Inverse Fast Fourier Transform) 340 and serialiser 350 stages to produce an I and a Q signal for the optical modulator 360. This converts the electrical signal to an optical signal for transmission, by modulation of the output of a laser 295.

Figure 11:
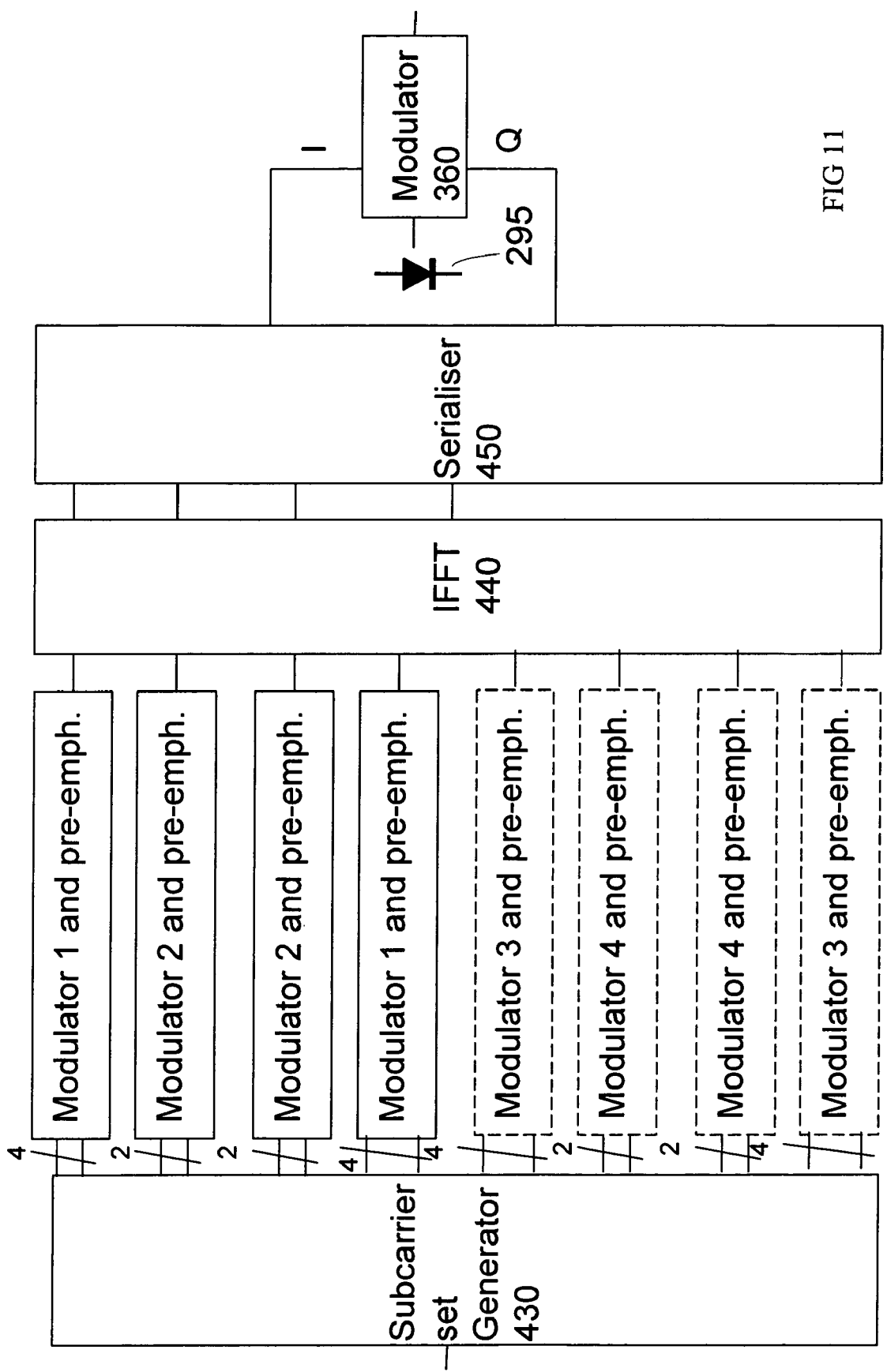

FIG. 11 shows another example. This case differs from FIG. 10 in that another degree of freedom is used, so that there are an additional four modulators, of types 3 and 4, as shown in dotted lines. The second degree of freedom could be for example polarization, in which case, the modulated stream from the dotted boxes could be fed to the optical modulator in such a way as to modulate a different polarization of light from the laser. In the figure, modulation on two different polarizations is illustrated by showing the modulator by the solid-line and dotted-line boxes. Practically, modulation on two polarizations is performed by inserting a polarization splitter and combiner and transmitter and receiver paths respectively. The modulated streams may include different levels of capacity and pre-emphasis for each degree of freedom. The subcarrier generator 430 is arranged to create more subcarrier streams as required. Likewise the IFFT 440 and serialiser block 450 are arranged to handle twice as many modulated streams compared to the example of FIG. 10. The modulator 360 is adapted to be able to create an optical signal with modulations on two orthogonal polarizations, among linear, elliptical and circular polarizations.

Figure 12:
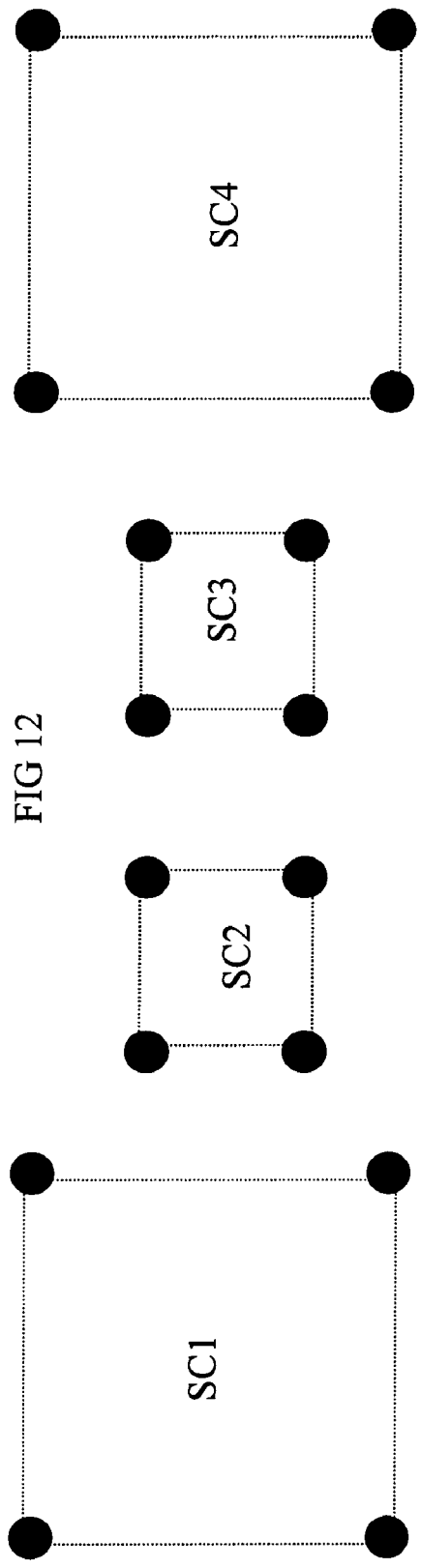
FIGS. 12 to 15 show examples of arrangements having different modulation formats for different subcarriers according to embodiments.

FIGS. 12 to 15 show schematically various arrangements of modulation amplitudes or formats for the different sub carriers, SC1-SC4, or SC1-SC5. Each diagram shows a constellation of points in a complex frequency domain, permitted for a given modulation format. Each point is used to represent a different data value for a symbol. A demodulator in the receiver recovers the data value by determining which of the points is closest to the received complex signal value at each symbol time interval. In such complex frequency diagrams, amplitude is represented essentially by distance between the points, or distance away from the centre of each diagram. FIG. 12 shows 4 diagrams, one for each of SC1 to SC4. SC1 and SC4 are at the edges of the frequency band for this group of sub carriers. As SC2 and SC3 diagrams have points closer to their centers, this shows the use of amplitude pre-emphasis that can be applied across some/all of the subcarriers using the same modulation format. In this example, QPSK (4-QAM) format is shown. The pre emphasis could also be applied by leaving a gap or gaps in the group of sub carriers between SC2 and SC3 in a frequency spectrum for example.

Figure 13:
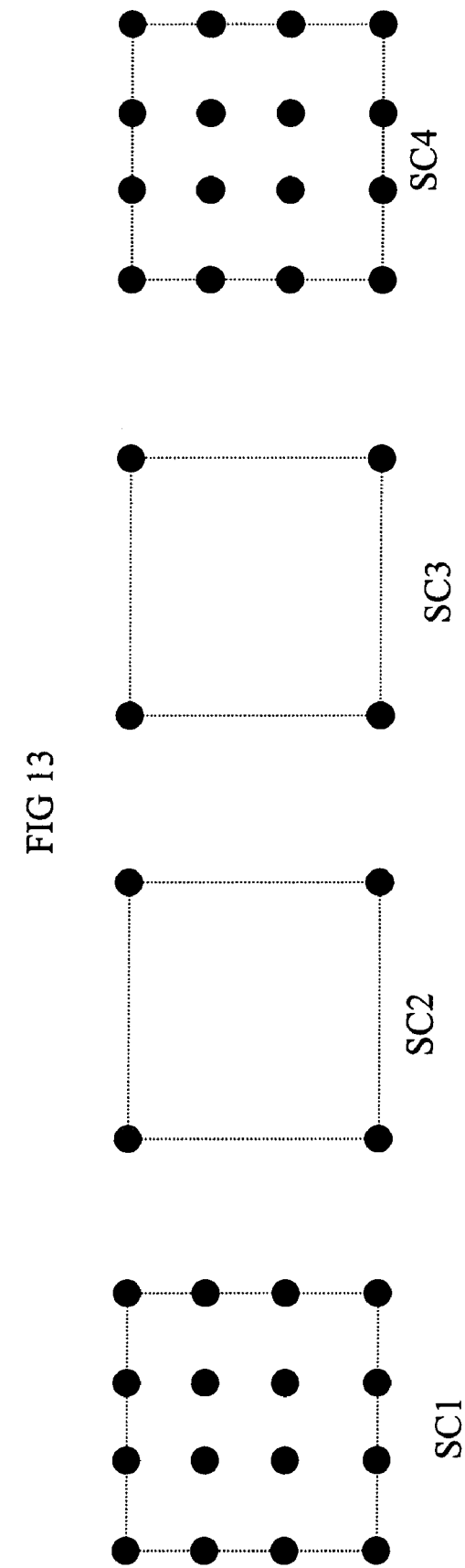

FIG. 13 shows a similar arrangement of diagrams, this time representing a system using different modulation formats for different subcarriers. SC1 and SC4 have points at two different distances from the centre, indicating two different amplitude levels. This enables a greater information density, since there are more points per symbol. This is multi-level QAM which can achieve higher spectral efficiency modulation. The sub carriers SC2 and SC3 closer to the centre of the band of sub carriers have a lower information density. There is no correlation in the distance between diagrams in the horizontal axis, each modulation format within the dotted box implies one subcarrier frequency bin. As before this can be combined with other pre emphasis such as amplitude differences between subcarriers.

Figure 14:
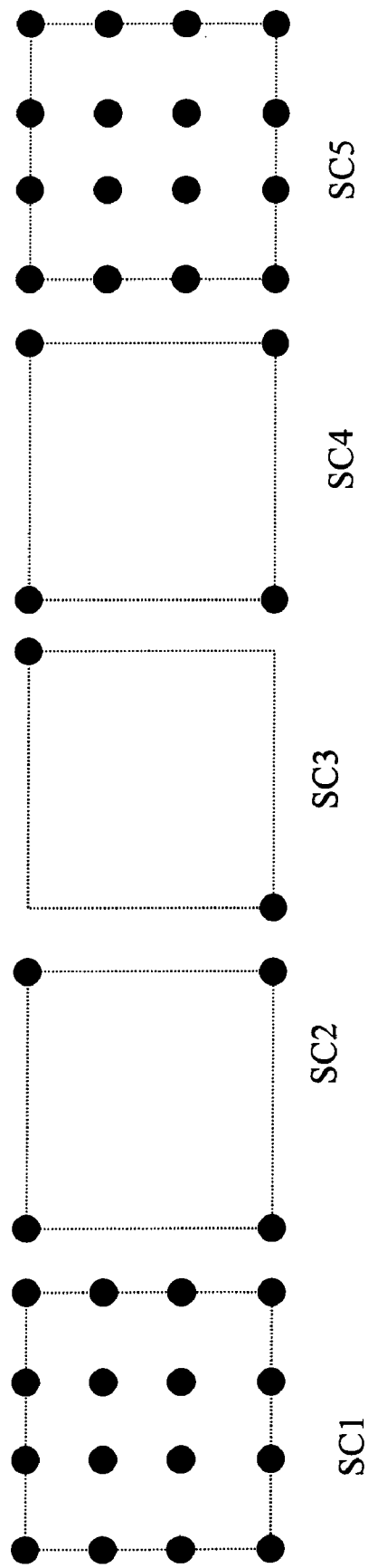

FIG. 14 shows the use of multiple modulation formats with an odd number of subcarriers. In the minimum case this just consist of two symbols (BPSK), shown by two points in the diagram for SC3 at the center of the band of subcarriers, and multi-level QAM for high spectral efficiency modulation for SC1 and SC5 at the edges of the band. This also can be combined with other pre emphasis such as amplitude pre-emphasis on some/all of the subcarriers, and leaving gaps in the middle of the band.

Figure 15:
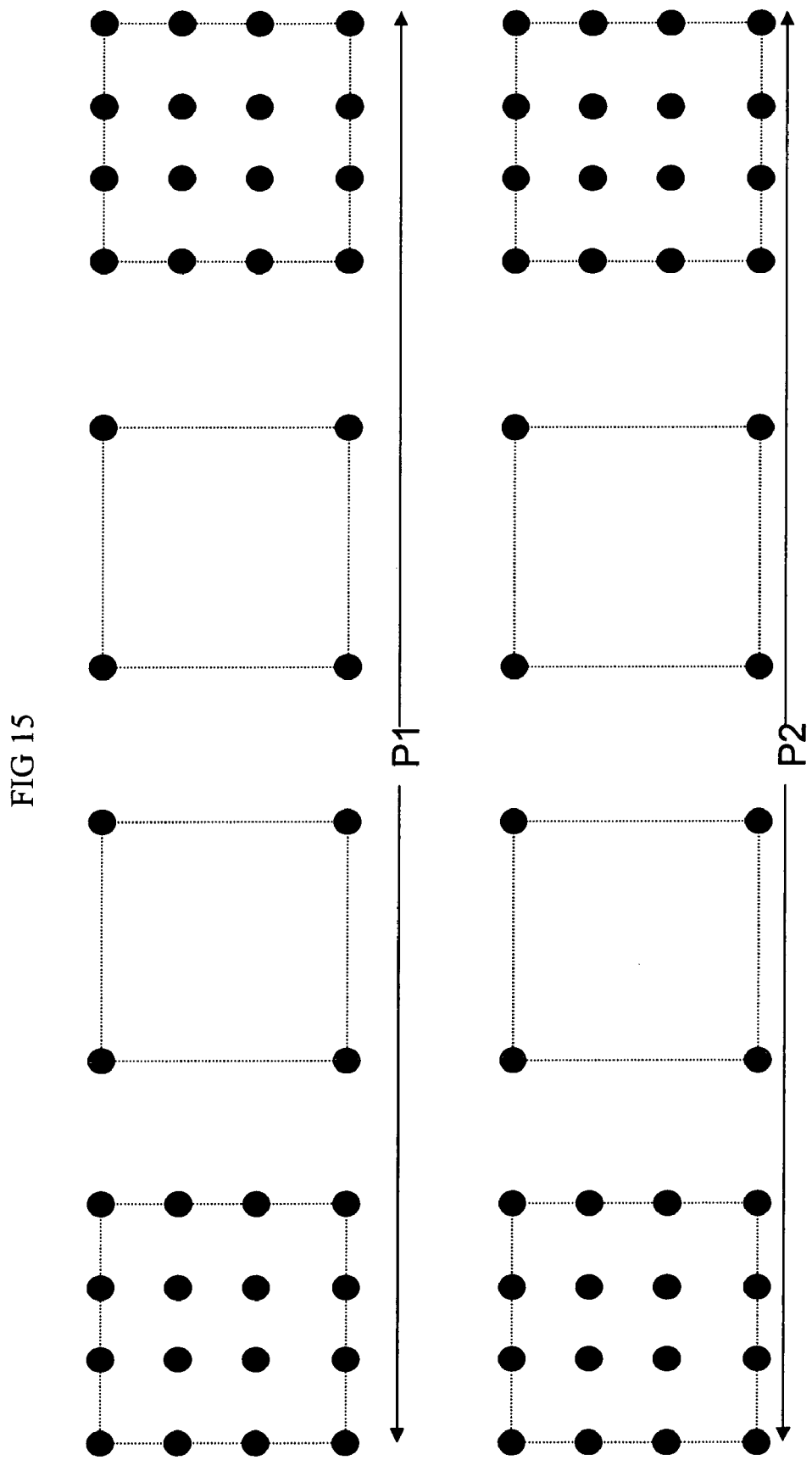

FIG. 15 shows the use of multiple modulation formats, applied on another degree of freedom, in this example, transmitting different data on each of two polarisations (P1 and P2). As shown, the arrangement of FIG. 13 is used. Any other arrangement of modulation formats can be used with multiple polarizations. As before, this can be combined with other pre emphasis such as amplitude pre-emphasis on some/all of the subcarriers, and leaving gaps in the middle of the band.

Concluding Remarks

As has been described above, a transmitter for an optical transmission system transmits an optical sub carrier multiplexed signal comprising number of sub-carriers, onto an optical transmission path, and provides spectral shaping by different magnitudes of the sub-carriers, or different modulation formats for different sub carriers. This spectral shaping can reduce performance degradation by Kerr effect optical non linearities. This can mean higher input powers may be launched. The magnitudes can provide a signal spectrum which is lower near a centre of a band of sub carriers than near an edge of the band. Such spectral shaping can be provided in the receiver either or both to undo the pre emphasis in the transmitter, and to reduce non linearities from components at the receiving side.

Other variations will be apparent to those skilled in the art, having corresponding advantages to those set out above, within the scope of the claims.

The invention claimed is:

1. A transmitter for an optical transmission system arranged to transmit onto an optical transmission path, an optical sub carrier multiplexed signal comprising a number of sub-carriers in a band, the optical transmission path having impairments causing inter-subcarrier nonlinear interactions due to the Kerr effect in the path, and thus causing differing error rates for different ones of the sub-carriers, the error rates contributing to an aggregate error rate for the band, and the transmitter being arranged to selectively differentiate the sub-carriers to compensate differences between the contributions to the aggregate error rate caused by the inter-subcarrier nonlinear interactions due to the Kerr effect, wherein the sub-carrier output profile, which profile comprises the combination of the individual output profiles of said sub-carriers of said band, is non-uniform in amplitude or spacing or modulation scheme employed.

2. The transmitter of claim 1, arranged to selectively differentiate the sub carriers by using different power levels thereby providing a sub-carrier output profile which is non-uniform in amplitude.

3. The transmitter of claim 2, the power levels being arranged to provide a signal power spectrum which is higher near a centre of the band than near an edge of the band.

4. The transmitter of claim 2, the power levels being arranged to provide a signal power spectrum which is lower near a centre of the band than near an edge of the band.

5. A system comprising the transmitter of claim 2 and a receiver, the receiver having an adjuster for adjusting the power levels of the sub carriers to reverse the differentiation of power levels applied at the transmitter.

6. The transmitter of claim 1, arranged to selectively differentiate the sub carriers by using different modulation schemes.

7. The transmitter of claim 6, arranged to modulate the data to provide a data density which is lower near a centre of the band than near an edge of the band.

8. The transmitter of claim 6, arranged to modulate the data across the different sub-carriers using more than one modulation format.

9. The transmitter of claim 1, arranged to selectively differentiate the sub carriers by using different amounts of error correction.

10. The transmitter of claim 1, the band comprising one or more unused sub carrier frequencies arranged nearer a centre of the band than an edge of the band.

11. The transmitter of claim 1, having an arrangement for dynamically altering the sub-carriers on the basis of measured error rates, to reduce differences in the error rates.

12. The transmitter of claim 1, arranged to use orthogonal frequency division multiplexing.

13. The transmitter of claim 1, having an electronic circuit for altering the magnitudes of the sub-carriers relative to each other before conversion to an optical signal.

14. The transmitter of claim 1 having an optical filter for altering the magnitudes of the sub-carriers relative to each other.

15. A method of offering a communications service over a system having the transmitter of claim 1.

16. A transmitter for an optical transmission system, the transmitter being arranged to transmit an optical sub carrier multiplexed signal comprising a number of sub-carriers in a band, onto an optical transmission path, the transmitter being arranged to modulate the sub-carriers with data differently for different ones of the sub-carriers so as to compensate for inter-subcarrier nonlinear interactions due to the Kerr effect in the optical transmission path, wherein the sub-carrier output profile, which profile comprises the combination of the individual output profiles of said sub-carriers of said band, is non-uniform in modulation scheme employed.

17. The transmitter of claim 16, the data being modulated so that different ones of the sub-carriers have different data densities.

18. The transmitter of claim 17, being arranged to provide different relative power levels of the sub-carriers.

19. A receiver for an optical transmission system, for receiving an optical sub carrier multiplexed signal comprising a number of sub carriers in a band, and having an adjuster for adjusting power levels of the sub carriers so as to compensate for inter-subcarrier nonlinear interactions due to the Kerr effect in the optical transmission path, wherein the sub-carrier output profile, which profile comprises the combination of the individual output profiles of said sub-carriers of said band, is non-uniform in amplitude.

20. The receiver of claim 19, the sub carriers of the received optical signal having different power levels, the adjuster at the receiver being arranged to adjust the magnitudes to reduce the differences.

21. The receiver of claim 19, for receiving sub-carriers having power levels higher near the center of the band, the adjuster being arranged to reduce the power levels of those sub carriers near a center of the band.

22. A receiver for receiving an optical sub carrier multiplexed signal comprising a number of sub carriers in a band, with different ones of the sub-carriers being modulated with data differently wherein the sub-carrier output profile, which profile comprises the combination of the individual output profiles of said sub-carriers of said band, is non-uniform in modulation scheme employed, the receiver having a demodulator for demodulating the different sub carriers, the differences in modulation being arranged to compensate for inter-subcarrier nonlinear interactions due to the Kerr effect in the optical transmission path.

23. The receiver of claim 22, having an adjuster for adjusting magnitudes of the sub carriers.

24. A transmitter for an optical transmission system arranged to transmit an optical sub carrier multiplexed signal comprising number of sub carriers in a band of adjacent sub carrier frequencies, onto an optical transmission path, the sub carriers having different power levels, those which are near a centre of the band having higher power levels than those near an edge of the band so as to compensate for inter-subcarrier nonlinear interactions due to the Kerr effect in the optical transmission path.

25. A sub carrier element for an optical communication system arranged to carry data on a number of sub carriers in a band, the element being arranged to alter relative power levels of the sub carriers such that the sub-carrier output profile, which profile comprises the combination of the individual output profiles of said sub-carriers of said band, is non-uniform in amplitude so as to compensate for inter-subcarrier nonlinear interactions due to the Kerr effect in the optical transmission path.

26. A method of transmitting an optical sub carrier multiplexed signal comprising number of sub-carriers in a band of adjacent sub carrier frequencies, onto an optical transmission path, the sub carriers having an output profile, which profile comprises the combination of the individual output profiles of said sub-carriers of said band, which is non-uniform in amplitude, with a signal spectrum which is higher near a centre of the band than near an edge of the band so as to compensate for inter-subcarrier nonlinear interactions due to the Kerr effect in the optical transmission path.

* * * * *